United States Patent [19]
Court

[11] 3,762,126
[45] Oct. 2, 1973

[54] ARTICLE FEEDER FOR A PACKAGING MACHINE

[75] Inventor: Wilbur M. Court, Rockford, Ill.

[73] Assignee: Rexham Corporation, New York, N.Y.

[22] Filed: Dec. 10, 1971

[21] Appl. No.: 206,784

[52] U.S. Cl............................ 53/55, 53/67, 53/77, 53/157, 53/252, 53/253
[51] Int. Cl....................... B65b 57/06, B65b 57/14
[58] Field of Search .................... 53/55, 67, 77, 155, 53/156, 157, 252, 253

[56] References Cited
UNITED STATES PATENTS

| | | | |
|---|---|---|---|
| 1,979,207 | 10/1934 | Milmoe.................................. | 53/157 |
| 2,263,501 | 11/1941 | Jones..................................... | 53/156 |

*Primary Examiner*—Travis S. McGehee
*Attorney*—Wolfe, Hubbard, Leydig, Voit & Osann

[57] ABSTRACT

Open cartons are carried step-by-step by an intermittent conveyor along a predetermined path to a loading station where an article feeder automatically inserts an article and an informative leaflet into each carton during the dwell period of the intermittent conveyor. Initially, the leaflet is positioned at the loading station across the open carton for insertion into the carton. A first detector produces a signal as an incident to sensing the presence of the leaflet in this position and, in response to the signal, an escapement mechanism at the end of a supply conveyor releases one article from a supply of articles for movement by the supply conveyor onto a carrier located at a pick off station spaced from the loading station. The carrier is movable between the pick off station and the loading station to deliver the article to the loading station and into a position for insertion into the carton dwelling at the loading station. A second detector produces another signal when the article is on the carrier and ready to be delivered to the loading station. A third detector produces still another signal to indicate that a non-defective carton is positioned in the loading station to receive the article and the leaflet. Upon receipt of the latter two signals, a drive mechanism of the feeder is actuated to move the carrier to deliver the article to the loading station. At the loading station, a reciprocable plunger drives the article from the carrier and into the open carton. As the article is driven into the carton, the informative leaflet is folded along the sides of the article and is stuffed into the carton by the advancing article. When the plunger retracts, a pick off device pulls another leaflet from the bottom of a magazine adjacent the loading station and positions the leaflet to be stuffed into the next carton on the next cycle of the feeder.

17 Claims, 16 Drawing Figures

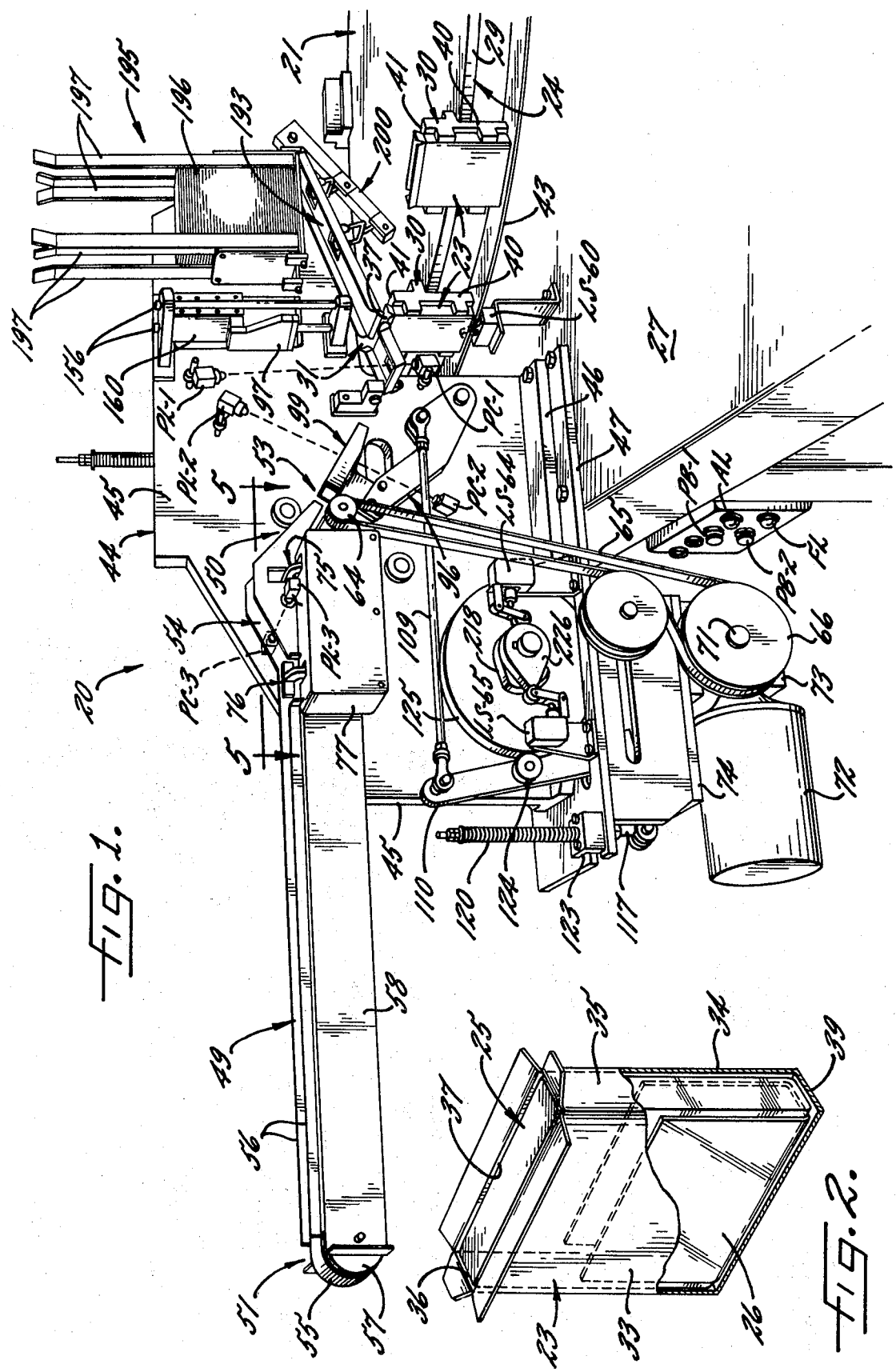

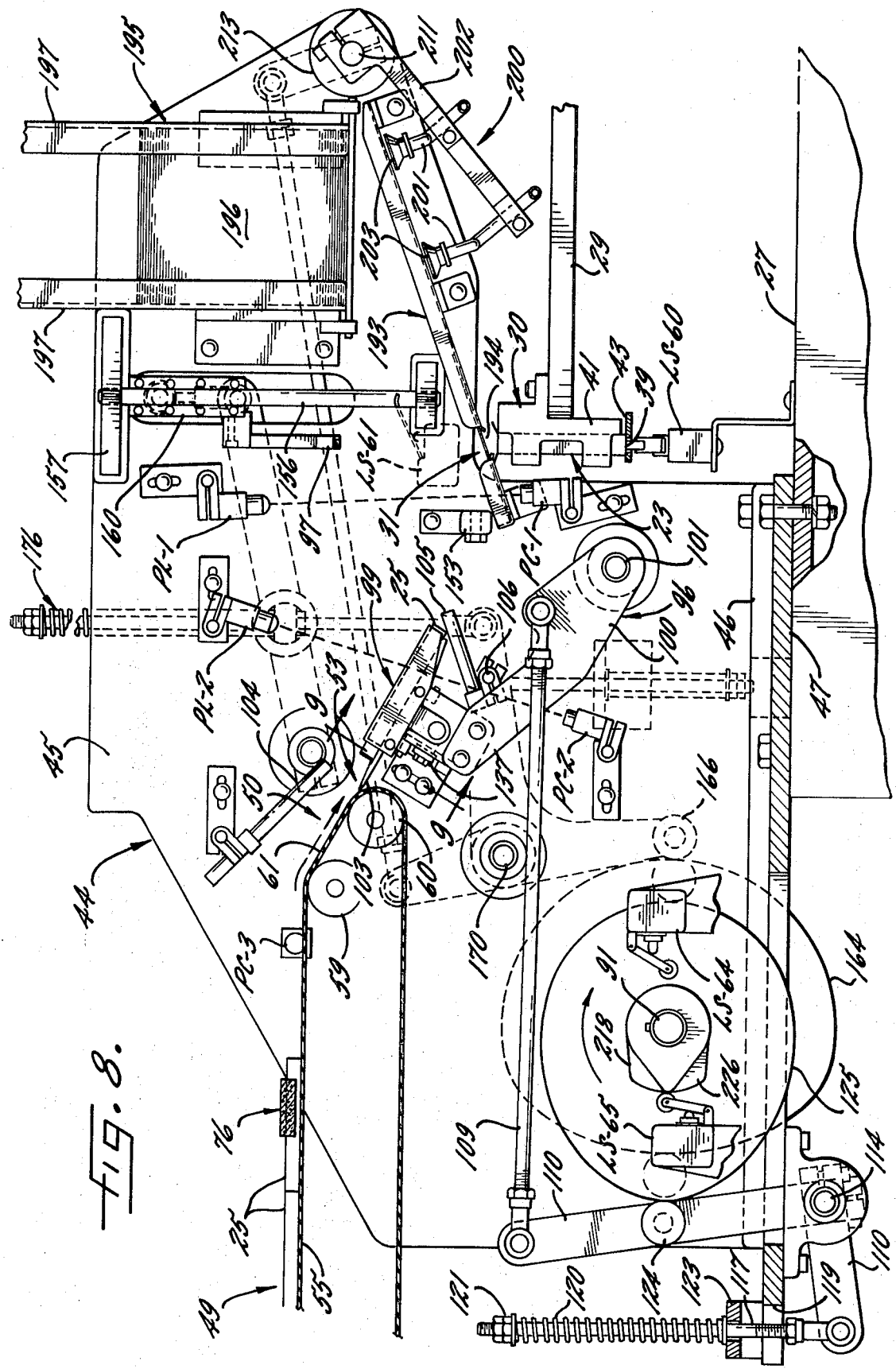

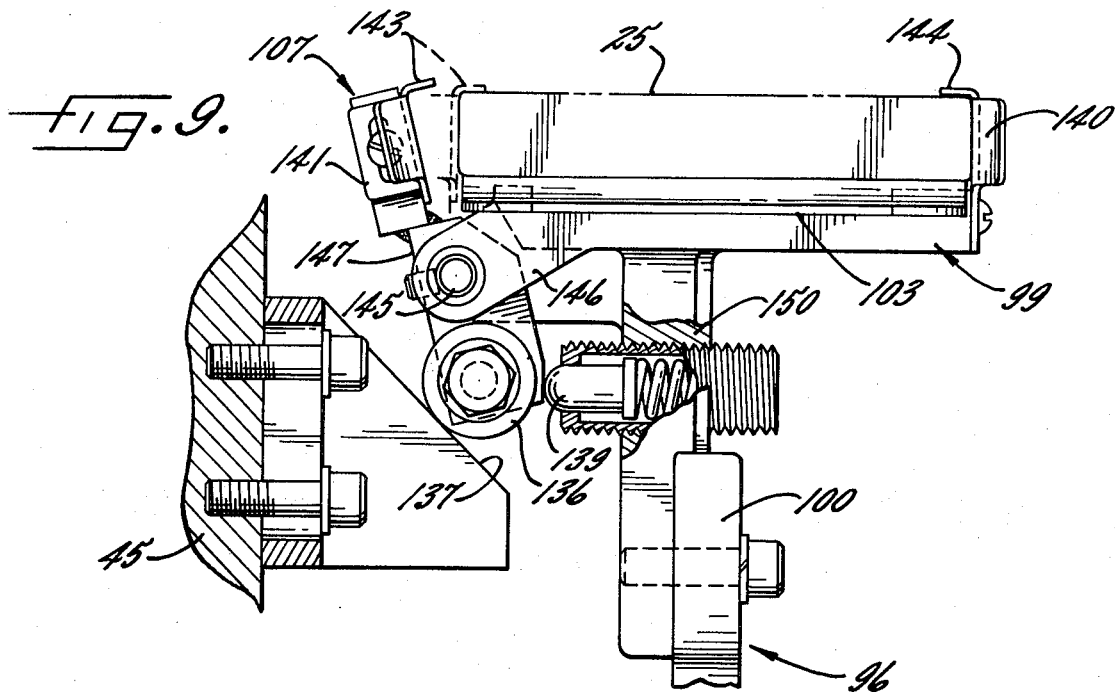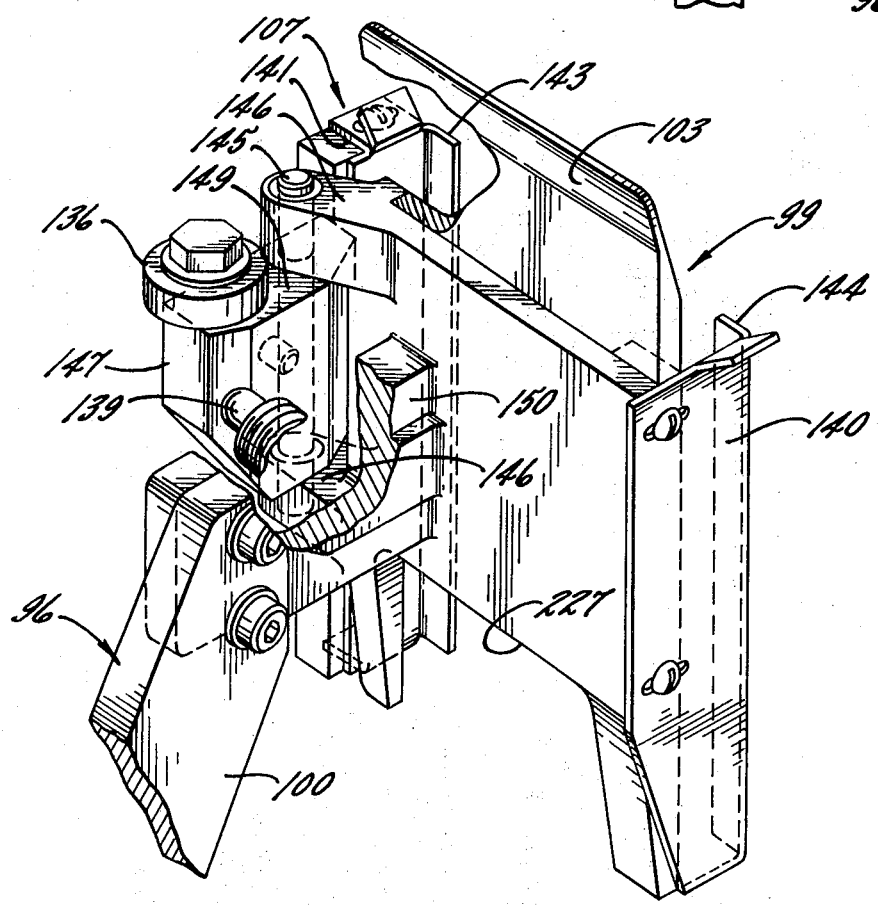

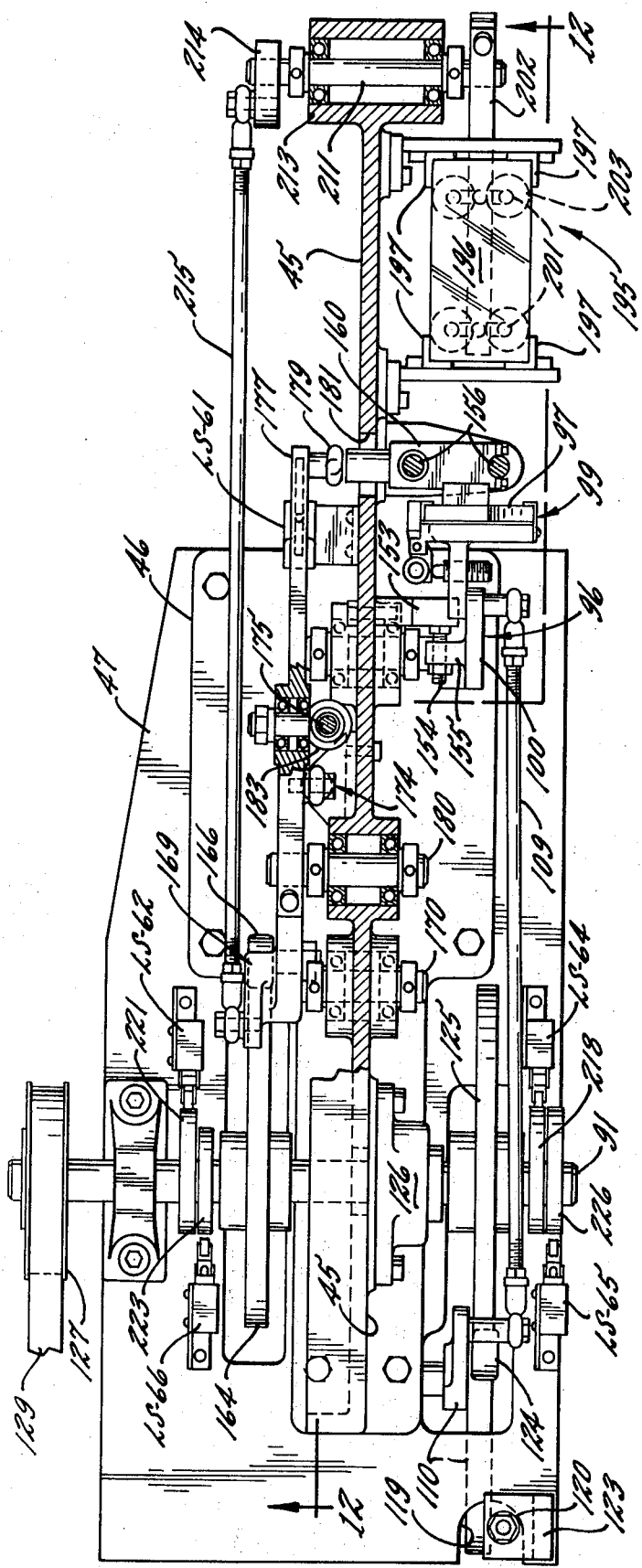

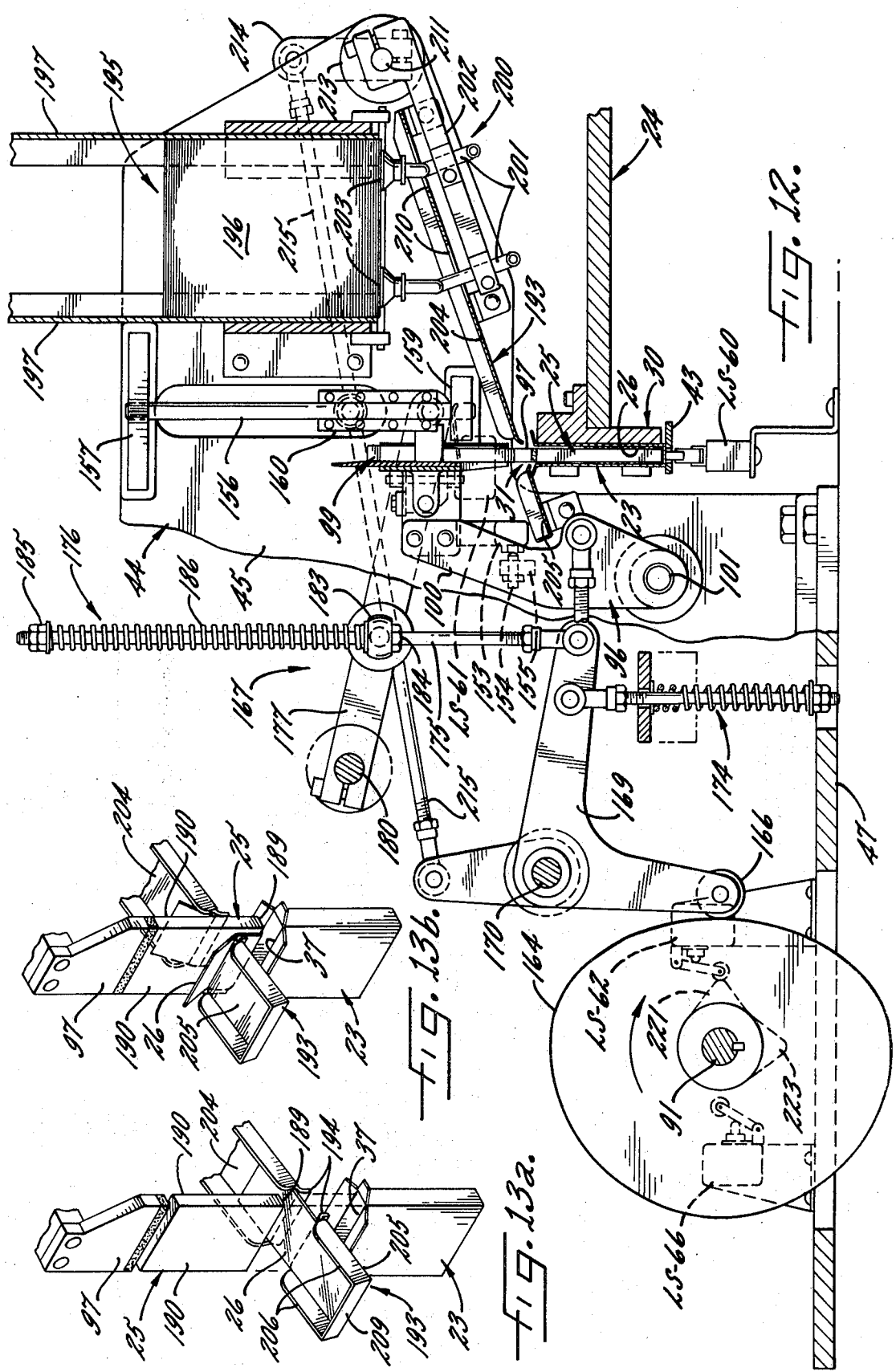

ARTICLE FEEDER FOR A PACKAGING MACHINE

BACKGROUND OF THE INVENTION

The present invention relates to an automatic article feeder for use in conjunction with a packaging machine in which open cartons are advanced step-by-step to a loading station where each receives an article and an informative leaflet. More particularly, the invention relates to the type of feeder which serves to place an article into an open carton by delivering the article from a supply of articles located adjacent the loading station and by inserting the delivered article into the carton during the dwell period of the package machine.

SUMMARY OF THE INVENTION

The primary object of the present invention is to provide a new and improved feeder which, when compared with prior feeders of the same general character, is more reliable and trouble-free in service use and is much quicker in operation to insert the article and leaflet into each dwelling carton.

Another object is to provide a feeder in which articles proceeding horizontally along a supply conveyor are turned into upright positions and are rammed into the cartons as an incident to the delivery of the articles to the loading station.

A further object is to advance the articles along a continuously moving supply conveyor while interrupting the advance of the articles on the moving conveyor during loading of the cartons.

Another object is to provide a comparatively simple feeder in which the leaflet is stuffed into the carton by the article itself as an incident to the insertion of the article into the carton. A related object is to fold the leaflet automatically with the article as an incident to stuffing the leaflet into the carton.

The invention also resides in the novel construction and arrangement of parts of the feeder for delivering the articles from the supply conveyor to the loading station, for turning the articles into upright positions, for delivering the leaflets to the loading station and for ramming the articles and the leaflets into the cartons.

Another important object of the present invention is to sense and signal the condition and presence of a carton in the loading station and to avoid loading an article and a leaflet into a defective or non-existent carton. A related object is to sense and signal the presence of the article and leaflet prior to their insertion into the carton and to disable the feeder if either the article or the leaflet is absent.

Still a further object is to insure that each article is properly inserted into its carton prior to advancing the carton from the loading station.

These and other objects and advantages of the present invention will become more apparent from the following detailed description when taken in conjunction with the accompanying drawings.

BRIEF DESCRIPTION OF THE DRAWINGS

FIG. 1 is a fragmentary perspective view of a packaging machine equipped with an automatic article feeder embodying the novel features of the present invention.

FIG. 2 is a perspective view of a carton with parts broken away to show an exemplary article and leaflet in the carton.

FIG. 8 is an enlarged fragmentary elevational view of the feeder shown in FIG. 1.

FIG. 9 is an enlarged fragmentary cross-sectional view taken substantially along the line 9—9 of FIG. 8.

FIG. 10 is an enlarged fragmentary perspective view of certain parts of the feeder shown in FIG. 1.

FIG. 11 is an enlarged fragmentary plan view of the feeder as shown in FIG. 1 with parts moved, broken away and shown in section.

FIG. 12 is a fragmentary cross-section taken substantially along the line 12—12 of FIG. 11.

FIGS. 13a and 13b are enlarged schematic perspective views of an article and a leaflet being inserted into a carton during operation of the feeder.

DETAILED DESCRIPTION OF THE PREFERRED EMBODIMENT

Figure 3:
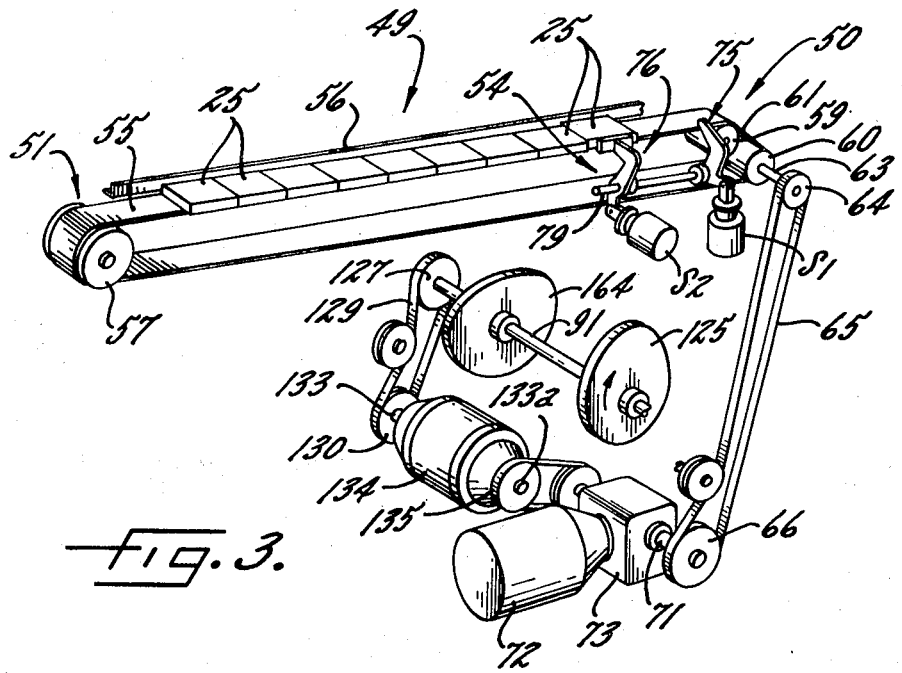
FIG. 3 is a perspective view of part of the drive unit of the feeder.

As shown in the drawings for purposes of illustration, the present invention is embodied in an automatic article feeder 20 for use in a packaging machine 21 in which upright cartons 23 are advanced one-by-one along a predetermined path and through a plurality of work stations by an intermittent conveyor 24. After the cartons have been squared into an open box shape and sealed closed at their lower ends, an article 25 and a leaflet 26 are inserted automatically into each of the cartons, the leaflet herein containing printed information regarding the article. The cartons containing the articles and leaflets eventually are sealed closed at their upper ends and are removed from the conveyor for further processing.

Herein, the feeder 20 is shown in conjunction with a packaging machine 21 which includes an intermittent rotary-type conveyor 24 for carrying the cartons 23, but the feeder is suited equally well for use with various types of intermittent packaging machines regardless of whether the intermittent conveyor is rotary, endless or some other type. As shown in FIG. 1, the rotary conveyor 24 of the packaging machine is mounted above a support or bed 27 and includes a generally circular table 29 with holders 30 mounted at spaced locations around the periphery of the table to carry the cartons. A central hub (not shown) supports the table on the bed and is rotated intermittently by a drive unit 32 (shown schematically in FIG. 14) to advance the holders and cartons step-by-step along the predetermined path and through a loading station 31 where the articles are inserted into the cartons.

As shown in FIGS. 1 and 2, each carton 23 arriving at the loading station 31 is of a generally rectangular box shape with opposing side panels 33 and 34, narrow end panels 35 and 36, an open upper end 37 and a closed bottom 39. The holders 30 each include two vertical legs 40 (FIG. 1) which engage the end panels while a central web 41 spans the two vertical legs and coacts with a curved retainer bar (not shown) fixed on the bed 27 to hold the cartons radially within the holder. A fixed flat ring 43 on the bed 27 extends around the table and is positioned slightly below the lower edges of the holders to prevent the cartons from falling downwardly out of the holders, the bottoms 39 of the cartons sliding on the ring as the rotary conveyor 24 advances.

Located adjacent the loading station 31 is the feeder 20 which stores a supply of the articles 25 and automatically feeds one article into each carton 23 as the latter rests at the loading station during the dwell period of the rotary conveyor 24. As shown in FIG. 1, the feeder includes an upright frame 44 which extends away from the loading station and the rotary conveyor in a direction generally radially of the path of the advancing cartons. More particularly, the frame is defined by a thick plate 45 which extends upwardly from an integral flange 46. The latter projects horizontally from both sides of the plate, extends along the lower edge thereof and is bolted both to an underlying rectangular support 47 and to the bed 27 of the packaging machine 21. Additional bolts fasten the support to the bed so that the outer end portion of the plate 45 is cantilevered beyond the edge of the bed while the upper inner end portion overhangs the path of the advancing cartons.

Mounted on the cantilevered end portion of the plate 45 is an elongated supply conveyor 49 with an inner end 50 located on one side of the plate at a position spaced from the loading station 31 and with an outer end 51 extending beyond the outer end of the plate. The supply conveyor transports the articles 25 to a pick off station 53 for subsequent delivery to the loading station 31, the pick off station being located adjacent the inner end of the supply conveyor. Advantageously, an escapement mechanism 54 is used to release the articles one at a time to the pick off station as an article is needed for insertion into a carton. By virtue of the escapement mechanism, a relatively simple and inexpensive belt type conveyor can be run continuously and used as the supply conveyor and yet the articles are discharged from the conveyor for movement into the pick off station only when demanded and required by otherarticle-landing mechanisms to be described subsequently.

Figure 7:
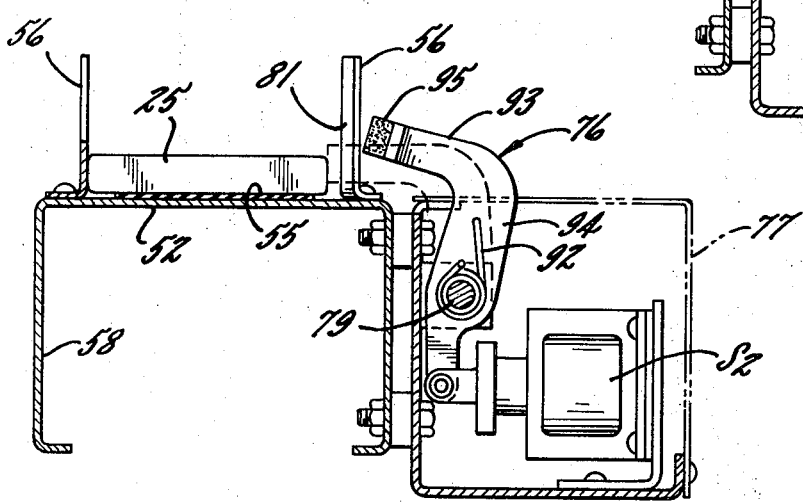

In operation, the articles 25 are placed in horizontal positions on the outer end 51 of the conveyor 49 (see FIGS. 3 and 8) and are carried toward the pick off station 53 by simple frictional engagement with a continuously driven belt 55. The latter is supported against vertical flexing by the cross member 52 of an inverted U-shaped channel 58 (FIG. 7) and extends between two spaced guide rails 56 which serve to prevent the articles from falling off the side edges of the belt. The outer end of the belt is trained around a large roller 57 (FIG. 3) while the inner end is trained around two smaller rollers 59 and 60. The roller 60 is spaced downwardly and inwardly from the roller 59 and thus the belt 55 slants downwardly toward the pick off station 53 to define a short downwardly and inwardly inclined ramp 61 at the inner end of the conveyor.

The lower roller 60 is mounted on a power shaft 63 which extends away from the side of the conveyor 49 as shown in FIG. 3 and which is rotated continuously to drive the belt 55. Fastened on one end of the shaft is a drive pulley 64 which is connected by a drive belt 65 to a large power driven pulley 66 mounted on one end of the output shaft 71 of a speed reducer 73 adapted to be driven by an electric motor 72 mounted on a substantially horizontal plate 74 (FIG. 1) beneath the cantilevered end of the support 47.

To deliver the articles 25 one at a time to the pick off station 53, the escapement mechanism 54 is located at a release point adjacent the upper roller 59 and just upstream of the ramp 61. Herein, the escapement mechanism includes a stop 75 (FIGS. 3, 5 and 6) which is movable from a release position above the path of the articles and into a catch position to block the articles from moving past the release point and down the ramp into the pick off station. When the stop is moved to its release position to enable the leading article to proceed down the ramp, a gripper 76 located upstream of the stop engages the next article and prevents that article and all of the trailing articles from moving toward the stop. The stop 75 and the gripper 76 are alternately actuated so that, when the stop is in its catch position, the gripper is retracted to allow the articles to advance in unison toward the stop with the leading article being blocked by the stop upon engaging the latter. Then, the gripper is actuated (as shown in phantom in FIG. 7) to hold the second article short of the stop and thereby block passage of the trailing articles past the gripper. At the same time, the stop is retracted to its release position as shown in phantom in FIG. 6 so that the first article is again engaged frictionally by the belt 55 and thus is advanced down the ramp 61 and into the pick off station 53. When either the stop or the gripper is used to block movement of the articles in a group, the belt 55 continues to move and slides beneath the articles and on top of the cross member 52. As soon as either the stop or clamp is retracted, each released article is immediately moved by virtue of its frictional engagement with the belt.

Figure 5:
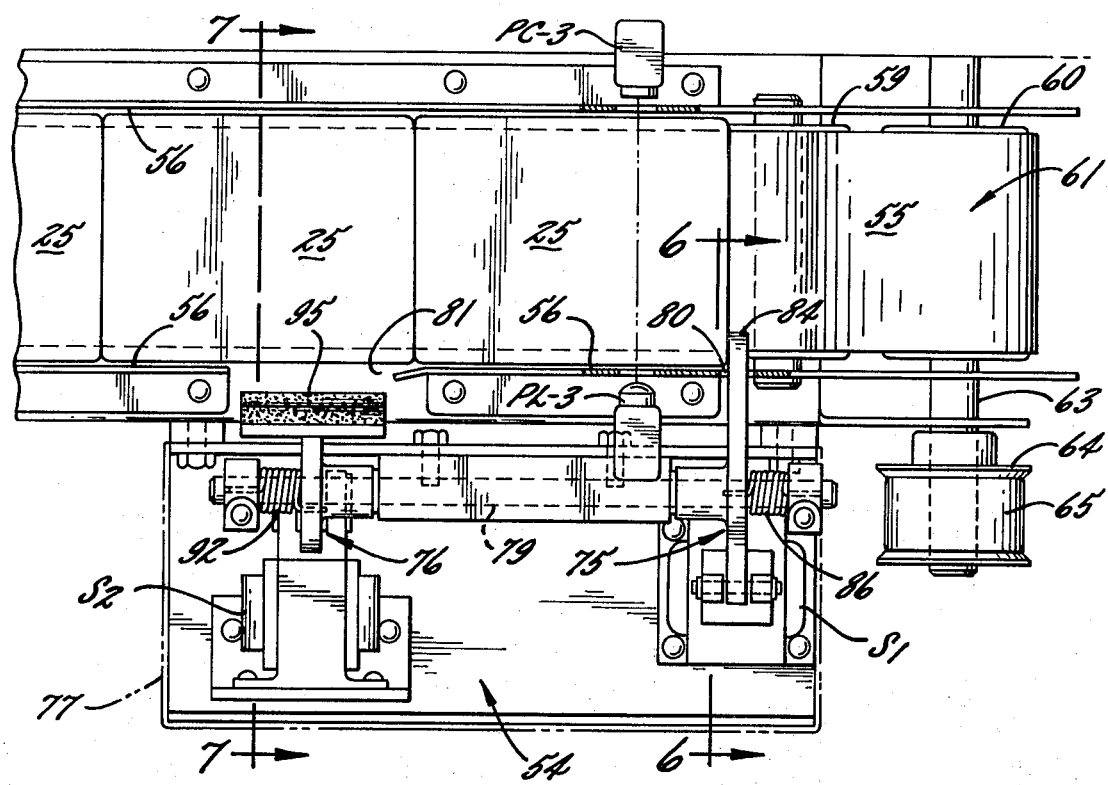
FIG. 5 is an enlarged fragmentary plan view taken substantially along the line 5—5 of FIG. 1 with parts removed and with certain parts shown in phantom for clarity in illustration.
Figure 6:
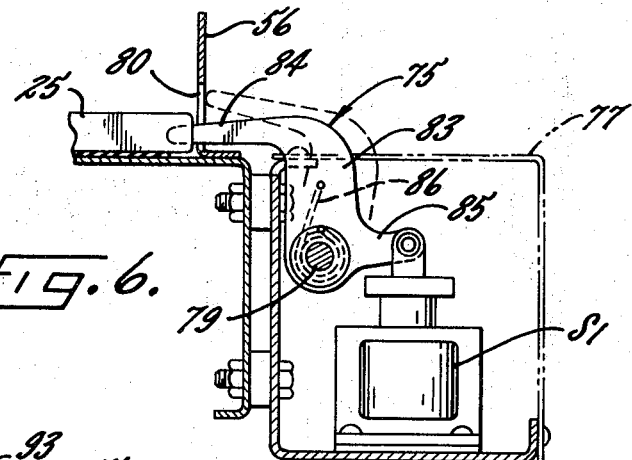
FIGS. 6 and 7 are enlarged cross-sectional views taken substantially along the lines 6—6 and 7—7, respectively, of FIG. 5.

As shown in FIGS. 1 and 5, the stop 75 and the gripper 76 are mounted within a protective housing 77 on a shaft 79 and are pivoted on the shaft to block and unblock the advancing articles 25, the stop and the gripper extending through openings 80 and 81 in the adjacent guard rail 56. Herein, the stop is a bellcrank (see FIG. 6) which is pivoted on the shaft and has a generally vertical leg 83, an upper horizontal leg 84 and a lower generally horizontal leg 85. The upper leg of the stop normally extends through the opening 80 to block the path of the advancing articles as the stop is urged in a counterclockwise direction on the shaft by a torsion spring 86 wrapped around the shaft (FIG. 5) and anchored between the shaft and the stop. The free end of the lower leg is connected to a solenoid S1 which is operable when energized to overcome the spring and pivot the stop 75 clockwise to the release position so as to permit the first article in line to advance to the pick off station 53. As will be described subsequently, the solenoid is actuated upon receipt of a signal during the dwell period of the rotary conveyor 24.

The gripper 76 (FIG. 7) is a lever pivoted on the shaft 79 and is formed with a generally horizontal upper arm 93 and with a substantially vertical leg 94 which is connected to a second solenoid S2. The solenoid S2 is energized in the same way and at the same time as the solenoid S1 and, when energized, operates the gripper by pulling on the lower end portion of the leg 94 to overcome a torsion spring 92 between the shaft and the leg and thereby pivot the horizontal arm 93 counterclockwise through the opening 81 and toward the second article in line. An elongated holding pad 95 attached to the free end of the horizontal arm 93 extends lengthwise along the path of the advancing articles 25 to engage the side of the second article when the solenoid S2 is actuated. As the pad engages one side of the article, the opposite side of the article is pushed against the guard rail 56 positioned along the opposite side of the conveyor so that the article is clamped between the holding pad and the guard rail. This causes the second article to block any further movement of the articles in a downstream direction while still permitting the conveyor belt 55 to slide beneath all of the articles except the first article, which is carried down the ramp 61 and into the pick off station 53.

In accordance with one aspect of the present invention, each article 25 is oriented into an insertion position in line with the open end 37 of the dwelling carton 23 as an incident to delivery of the article from the pick off station 53 to the loading station 31. For this purpose, the feeder 20 includes a novel carrier 96 (FIG. 1) operable upon receipt of the article from the escapement mechanism 54 to carry the article from the pick off station 53 to the loading station and to orient the article into the insertion position during such movement. Once the article has been delivered and oriented in position for insertion into the carton, a reciprocable plunger 97 is actuated to drive the article from the carrier and into the carton. To complete one cycle of the loading operation, the carrier is returned from the loading station to the pick off station and the carton conveyor 24 is advanced one step to bring the next open carton into the loading station.

As shown in FIGS. 1 and 8, the carrier includes a tray 99 mounted on the upper end of a pivot arm 100 which serves to carry the tray between the pick off station 53 and the loading station 31. The lower end of the pivot arm is fastened to a shaft 101 which is journaled in the plate 45. When the carrier is at the pick off station, the tray is inclined in line with the ramp 61 (see FIG. 8) with the bottom 103 of the tray positioned adjacent the lower end of the ramp (see FIG. 8) so that the belt 55 drives the article 25 down the ramp and into the tray. An adjustable deflector arm 104 fastened to the plate 45 above the ramp helps to guide the article into the tray. As the article enters the tray, it slides across the bottom of the tray, partially by its own momentum and partially by gravity, and eventually strikes a fixed rod 105 which serves as a stop to position the article in the tray. Herein, the rod is mounted on a support shaft 106 and can be adjusted angularly on the shaft to stop the article in a desired position on the tray.

Once the article 25 is positioned in the tray 99, the arm 100 is pivoted toward the loading station 31 and, as the arm moves away from the pick off station 53, a movable clamp 107 (FIGS. 9 and 10) is actuated to grip the article for bodily movement with the tray. Preferably, the clamp forms one side of the tray and serves to keep the article from falling off the tray as it is swung through an arc to the loading station. The arc through which the tray is swung is such that, when the initially inclined article arrives at the loading station, the article is oriented in an upright position in line with the dwelling carton 23.

To swing the carrier 96 between the pick off station 53 and the loading station 31, an elongated push rod 109 (FIGS. 4 and 8) is connected pivotally between the pivot arm 100 and one end of a bell crank lever 110 which is mounted on a horizontal pivot shaft 114 beneath the outer end portion of the support 47. Pivotally connected to the other end of the lever 110 is a vertical rod 117 which extends upwardly through an opening 119 in the support plate 47. A spring 120 is telescoped over the upper end portion of the rod and is compressed between a nut 121 screwed on the upper end of the rod and a bracket 123 mounted across the opening 119. The spring normally urges the lever 110 to pivot in a clockwise direction as viewed in FIG. 8 by pushing upwardly on the upper end of the rod and biases a follower 124 on the lever into engagement with the edge of a large generally elliptical cam 125.

The cam 125 is mounted on one end of a cycle shaft 91 which extends through a bearing housing 126 mounted on one side of the frame plate 45 (see FIGS. 3 and 11). Fastened to the opposite end of the shaft 91 is a pulley 127 (see FIG. 3) which is connected by means of a drive belt 129 to another pulley 130. The pulley 130 is fastened on the output shaft 133 of an electrically actuated clutch-brake unit 134. The input shaft 133a of the clutch-brake unit is connected by a belt 135 to the speed reducer 73 which is driven by the motor 72.

Thus, when the clutch-brake unit 134 is conditioned to drive the output shaft 133, the elliptical cam 125 is turned by the cycle shaft 91. Under the urging of the spring 120, the follower 124 rides over the edge of the cam and, as the low side of the cam approaches the follower, the lever 110 pivots in a clockwise direction to drive the push rod 109 in a horizontal direction toward the loading station 31. This, in turn, pivots the carrier arm 100 through an arc such that the tray 99 carrying the article 25 is delivered to the loading station in an upright position in line with the open end 37 of the carton 23 dwelling at the loading station.

To hold the article 25 for movement with the tray 99, the movable clamp 107 is actuated as a cam follower 136 rides off the edge of a stationary cam track 137 (FIG. 9) on the side of the plate 45 and causes a spring-loaded plunger 139 to urge the movable clamp toward a fixed clamp 140 which forms the other side of the tray. Thus, the article is held between the two clamps as the carrier 96 initially moves toward the loading station 31. Herein, the movable clamp (FIG. 10) comprises a generally T-shaped member with a cross piece 141 which forms one side of the tray 99 and includes a flange 143 extending toward the fixed clamp 140. The fixed clamp has a similar flange 144 and the two flanges cooperate with one another to serve as guides to keep the article from falling off the tray. The T-shaped member is mounted on the tray by means of a short pivot rod 145 which extends through bosses 146 integrally formed on the edge of the tray and through a support leg 147 connected to and extending generally perpendicular to the cross piece 141. The support leg is positioned between the two bosses and projects beyond the underside of the tray generally toward the free end of the carrier arm 100. Journaled on one edge 149 of the support leg adjacent the end of the tray is the cam follower 136 which, when the carrier is positioned at the pick off station 53, engages the stationary cam track 137 to keep the movable clamp open and thereby enable the article sliding down the ramp 61 to move into the tray and against the fixed rod 105 as shown in FIG. 8. As the carrier arm 100 is pivoted away from the pick off station, the follower rides off the cam track and, at this time, the spring-loaded plunger 139 pivots the movable clamp clockwise (shown in FIG. 9) toward the fixed clamp thereby gripping the article 25 for movement with the tray and to prevent the article from falling out of the lower end of the tray after the article has moved away from the rod 105. As shown in FIG. 9, the plunger engages the leg 147 and is supported by a bracket 150 which connects the tray to the arm 100.

To position the article 25 exactly in line with the carton 23 dwelling at the loading station 31, the carrier 96 engages a stop 153 (FIGS. 11 and 12) upon arrival at the loading station 31. Herein, the stop is mounted on the plate 45 and is engaged by a positioning screw 154 which extends through a finger 155 projecting toward the plate from the side of the arm 100 as shown in FIG. 11. The positioning screw can be threaded within the finger so that the end of the screw can be adjusted toward and away from the front side of the finger so as to stop the carrier when the article 25 is disposed between and in exact vertical alinement with the plunger 97 and the open end 37 of the carton 23.

Once the article 25 is in the proper position for insertion into the carton 23, the reciprocable plunger 97 is actuated to drive the article from the tray 99 and into the carton. Herein, the plunger is mounted to slide up and down on two spaced guide rods 156 (see FIGS. 4, 11 and 12) which extend vertically of the loading station 31 and are fastened to the plate 45 by upper and lower brackets 157 and 159. A slide block 160 rides up and down on the guide rods and carries the plunger 97 on its lower end.

To actuate the plunger 97 to drive the article 25 into the carton 23, a large cam 164 (FIGS. 4 and 12) on the cycle shaft 91 engages a cam follower 166 connected by a linkage 167 to the slide 160 to move the latter up and down as the follower rides the edge of the cam 164. More specifically, the follower 166 is mounted on a three-legged lever 169 which, in turn, is fastened to a pivot shaft 170 journaled on the plate 45 adjacent the cam 164. Connected intermediate the ends of one leg of the lever is a spring-loaded rod 174 (similar to the rod 117) which urges the lever clockwise (as viewed in FIGS. 4 and 12) to force the follower to ride along the edge of the cam 164.

Figure 4:
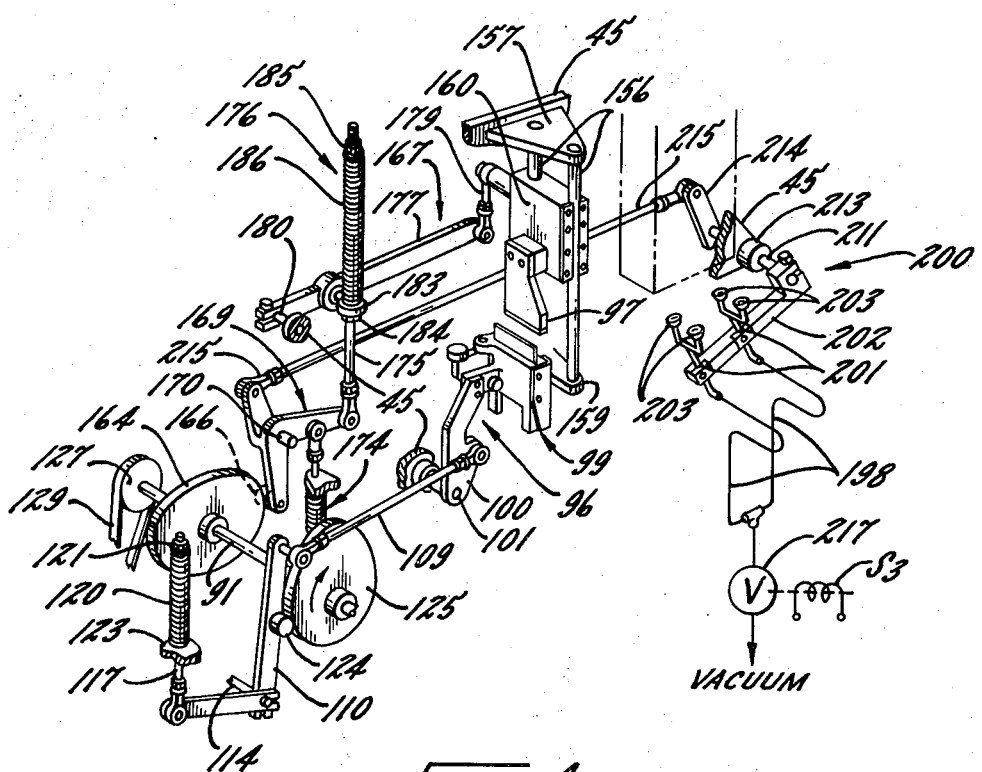
FIG. 4 is a perspective view of part of the actuating mechanism of the feeder.

As further shown in FIG. 4, the free end of one leg of the lever 169 is connected to a generally vertical rod 175 and the latter is connected through a spring safety mechanism 176 to a transfer arm 177 which, in turn, is pivotally connected by a link 179 pivoted on the slide 160 so as to move the slide vertically when the arm 177 is swung upwardly and downwardly. The transfer arm extends generally horizontal and parallel with the side of the plate 45 (see FIGS. 11 and 12) and is connected at one end to the plate by a pivot 180. The safety mechanism 176 comprises an eye 183 telescopically receiving the rod 175 and having one end journaled in the transfer arm 177. Threaded on the rod just beneath the eye is a nut 184 insuring a positive and direct upward thrust to the transfer arm 177 as the rod is shifted upwardly by the cam to retract the plunger 97 upwardly. Telescoped over the rod and compressed between the eye and an upper nut 185 is a spring 186 which is sufficiently stiff to normally hold the transfer arm 177 for downward movement by the rod 175 as the latter is pulled down by the lever 169 to force the article 25 downwardly into the carton 23 with the plunger 97. If, however, the article should jam when being inserted into the carton, the spring 186 yields to allow downward movement of the rod 175 and clockwise movement of the lever 169 even though the plunger, the slide 160 and the transfer arm 177 are prevented from moving because of the jammed article. Accordingly, the spring safety mechanism 176 reduces the danger of breakage occurring in the linkage 167 if an article should become jammed between the plunger 97 and the carton.

To summarize the operation of the feeder 20 as described thus far, articles 25 are loaded onto the supply conveyor 49 and are blocked by the stop 75. With the carrier 96 in the pick off station 53, the stop is released to allow the leading article 25 to proceed down the ramp 61 and into the tray 99, the article being stopped in the tray by the rod 105. At the same time, the gripper 76 is actuated to hold the second article on the conveyor and prevent that article and all succeeding articles from moving down the ramp even though the conveyor continues to run. After the first article has been delivered to the tray 99, the stop 75 is returned to its blocking position and the gripper 76 is released to enable the articles to advance on the conveyor and to position the leading article against the stop 75 preparatory to the next delivery of an article to the tray.

With an article 25 in the tray 99, the latter is swung from the pick off station 53 to the loading station 31 and, as an incident to such swinging, the cam follower 136 rides off of the cam track 137 to cause the movable clamp 107 to clamp the article in the tray before the article moves off of the rod 105. As the tray is swung toward the loading station, the article is turned to an upright position and moves into vertical alinement with the dwelling carton 23. After stopping of the tray, the plunger 97 is shifted downwardly to force the article out of the tray and to ram the article into the carton, the spring-loaded plunger 139 on the tray yielding to enable the article to be forced from the tray without need of positively opening the movable clamp 107.

After the article 25 has been loaded into the dwelling carton 23, the plunger 97 is retracted and the tray 99 is swung reversely from the loading station 31 to the pick off station 53. During such swinging, the rotary conveyor 24 is indexed one step to advance the filled carton from the loading station and to bring an empty carton into such station. as the tray reaches the pick off station, the cam 136 opens the movable clamp 107 and the stop 75 is released to deliver the next article into the tray.

In accordance with another important aspect of the present invention, the leaflet 26 is folded and stuffed into the carton 23 as an incident to the insertion of the article 25 into the carton and preferably by using the article itself to stuff the leaflet into the carton. For this purpose, the leaflet is positioned between the open end 37 of the carton and the article as shown in FIGS. 13a and 13b so that, as the article is inserted into the carton by the plunger 97, the lower end 189 of the article engages the leaflet intermediate its ends and folds the opposite end portions of the leaflet along the opposing sides 190 of the article while stuffing the leaflet into the carton.

Prior to inserting the article 25 into the carton 23, the leaflet 26 is oriented in position directly above the open end 37 of the carton and rests upon a slide 193 (see FIG. 12) mounted on the plate 45. The slide is formed with a vertical opening 194 located just above the carton and slants downwardly toward the loading station 31 from the underside of a magazine 195 within which is kept a stack 196 of the leaflets. The magazine is mounted on the end of the plate 45 adjacent the plunger 97 and above the loading station and includes four upstanding legs 197 which serve to confine the leaflets within the magazine. Near the lower end of the magazine, a movable suction pick off device 200 is connected pivotally to the plate 45 (see FIGS. 11 and 12) and includes a pivot arm 202 extending along the underside of the slide and carrying four upstanding tubes 201 which are connected to a vacuum source through flexible hoses 198 connected to the lower ends of the tubes. The upper ends of the tubes support suction cups 203 for pulling the bottom leaflet from the stack and delivering that leaflet to the slide to slip down the latter into position above the carton 23.

As shown in FIGS. 12 and 13a, the slide 193 is formed with an upper section 204 and a lower section 205, each having upturned sides 206 to keep the leaflet from falling out of the slide. The end of the lower section includes an upstanding lip 209 to keep the leaflet from sliding off the slide and to position an intermediate portion of the leaflet across the opening 194 which is formed between the two sections. The upper section includes two generally rectangular holes 210 (see FIG. 12) through which the suction tubes 201 are moved to pick off the lower leaflet 26 from the stack 196.

When picking off the lower leaflet 26 from the stack 196, the pick off device 200 is pivoted back and forth between the stack and the slide 193 in timed relationship with the operation of the plunger 97 and delivers the leaflet to the slide as the plunger is moved through its upstroke. Thus, a leaflet is delivered into position for insertion into the carton 23 at the end of each cycle so that the leaflet will be in place for insertion into the carton on the next subsequent cycle. More particularly, the arm 202 of the suction pick off is mounted rigidly on one end of a pivotal shaft 211 which extends through the plate 45 within a bearing housing 213 (FIG. 11). A lever arm 214 (FIG. 4) is fastened to the other end of the pivotal shaft and is connected pivotally to the front end of a link 215. The other end of the link is fastened pivotally to the upper end of one of the legs of the three-legged lever 169 and thus is moved back and forth generally in a horizontal direction to rock the shaft 211 and the pick off device 200 as the cam 164 rotates past the follower 166 to rock the lever. With this arrangement, the suction pick off 200 moves upwardly to grip the lower leaflet 26 on the down stroke of the plunger 97. Then, as the plunger is moved through its upstroke, the pick off delivers the leaflet to the slide 193 to position the leaflet for the next subsequent feeding cycle. With the leaflet 26 in position across the open end 37 when the article 25 is driven from the carrier 96 and into the carton 23, the lower end 189 of the article engages the intermediate portion of the leaflet and stuffs the leaflet through the opening 194 in the slide 193 and into the carton by folding the opposite end portions of the leaflet upwardly along the opposite sides 190 of the article. Thus, the leaflet is stuffed into the carton by the article itself as an incident to the insertion of the article into the carton so as to eliminate the need for a separate work station and a separate plunger for inserting the leaflet into the carton.

In accordance with still another important aspect of the present invention, the feeder 20 cycles through a feeding operation only when a carton 23 with a proper bottom seal is dwelling in the loading station 31 and only when the article 25 and the leaflet 26 are available for insertion into the carton. This is accomplished by allowing the feeder to cycle only in response to signals indicating that the article is in position to be delivered to the loading station 31, that the leaflet is in position to be inserted into the carton and that the carton is not defective and is in position to receive the article and the leaflet. Thus, the danger of delivering improperly filled and defective cartons from the packaging machine 21 is eliminated or reduced substantially because, before each feeding cycle can be started, it is assured that the article and the leaflet are present for insertion into the non-defective carton.

In the present instance, photoelectric cells PC-1 and PC-2 are mounted on the plate 45 adjacent the loading station 31 and the pick off station 53 (see FIG. 1), respectively, and serve to detect the presence of the leaflet 26 and the article 25 in the two stations. In addition, a limit switch LS60 (FIG. 1) is closed by each properly sealed carton 23 moving into the loading station and indicates the presence of the carton at the loading station. Herein, the limit switch is depressed by the bottom 39 of the carton and, as a result serves to check the seal closing the bottom of the carton. If the bottom of the carton has not been closed, the limit switch will not be actuated.

Figure 14A:
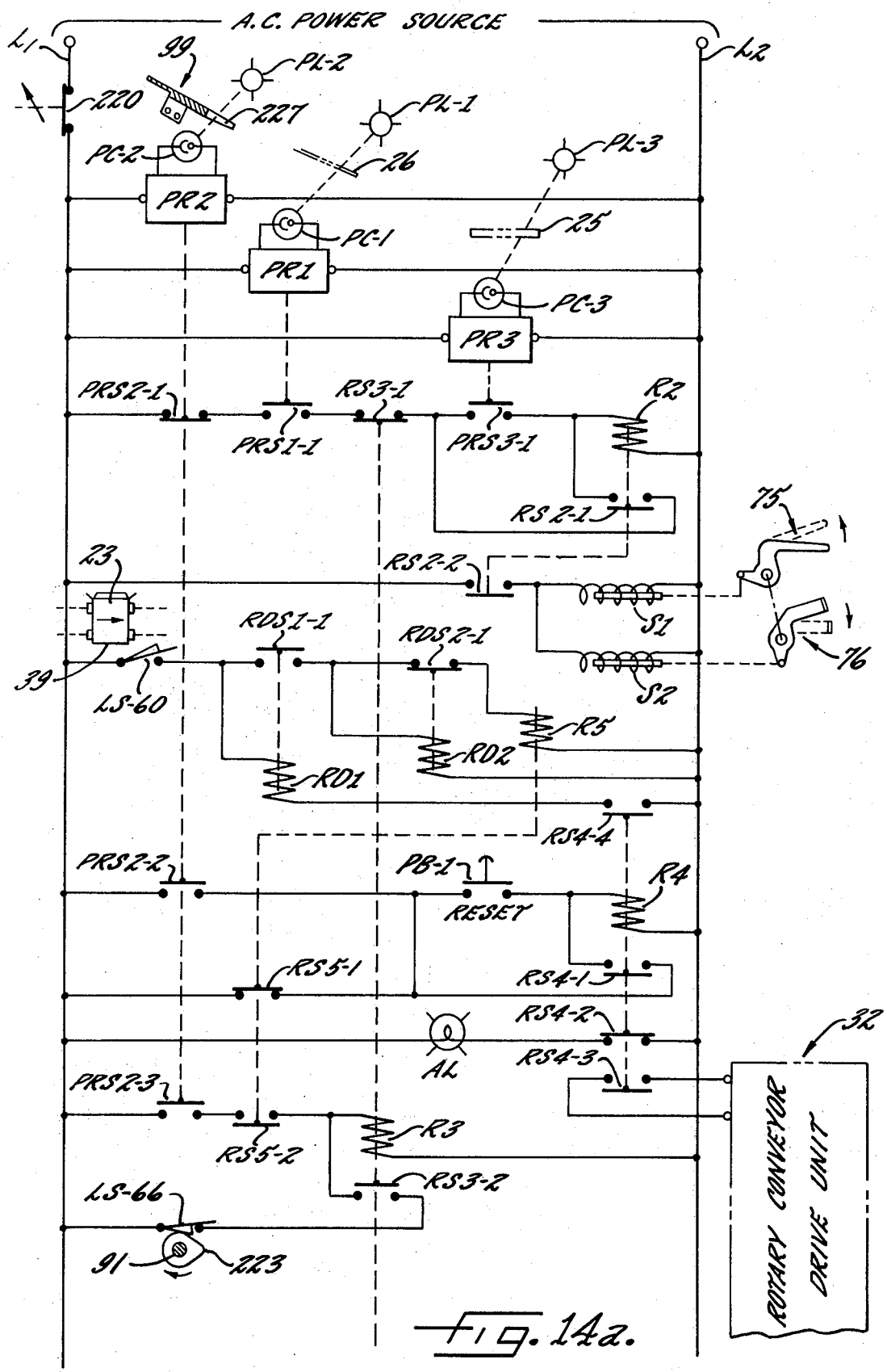
FIGS. 14a and 14b when joined together form a schematic diagram of the electrical circuitry for controlling the operation of the feeder.
Figure 14B:
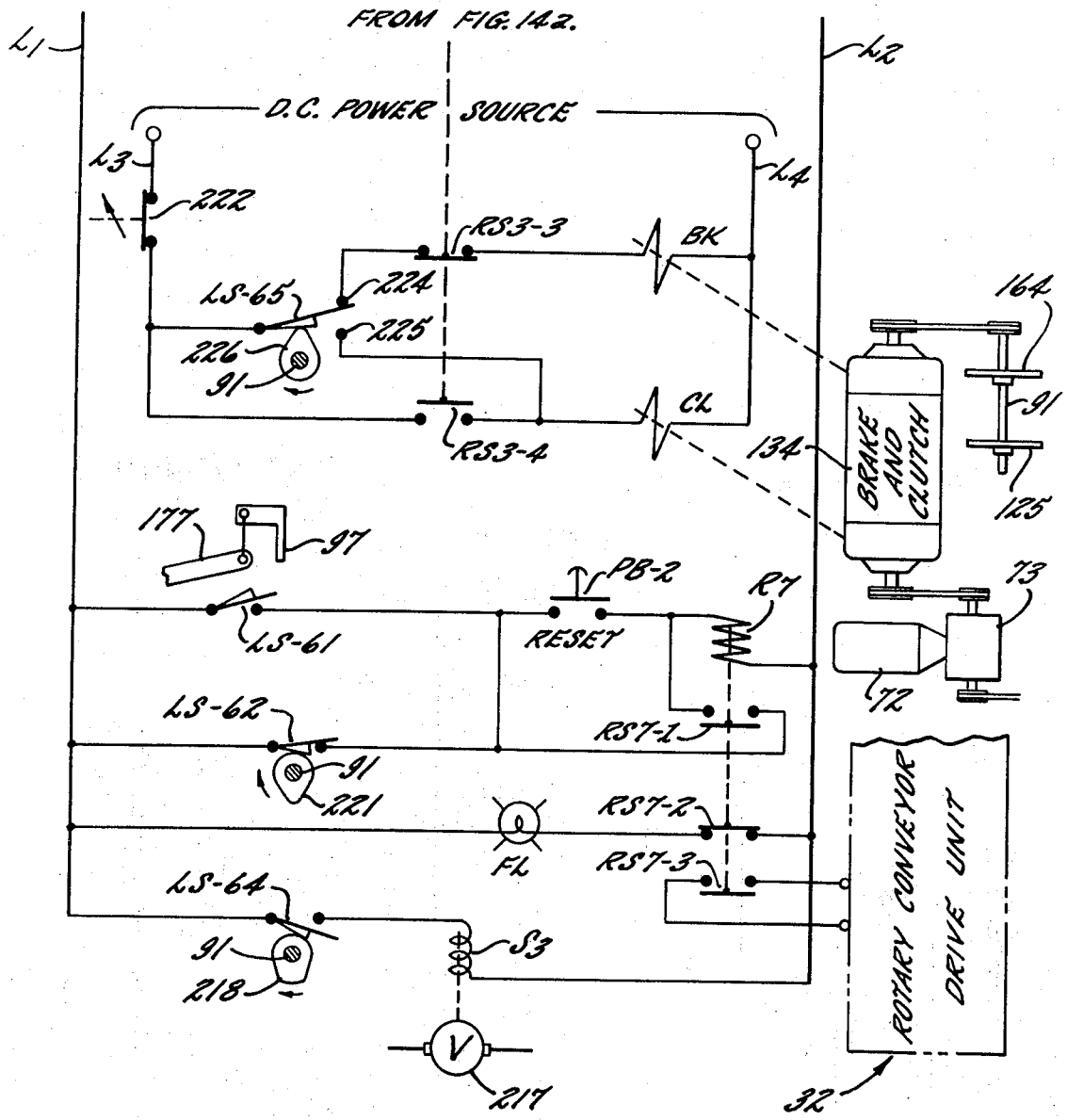

Once the leaflet 26, the article 25 and the carton 23 are in the positions just described, appropriate circuitry such as is shown in FIG. 14 is energized to actuate the clutch-brake unit 134 to cycle the feeder 20 during the dwell period of the rotary conveyor 24. To aid in understanding the automatic operation of the feeder 20 and the circuitry of FIG. 14, the circuit will be described in detail as it is energized to actuate the feeder to run through a feeding cycle with the following conditions assumed at the beginning of the cycle: (1) that no articles 25 are on the supply conveyor 49, (2) that no article is on the carrier 96 as it rests at the pick off station 53, (3) that the leaflet 26 is not in position to be inserted into the carton 23 and (4) that the carton is in position to advance into the loading station 31. In the present instance, the various relays, solenoids and switches of the circuit, except for the switches and coils of the clutch-brake unit 134, are connected across power lines L-1 and L-2 which are energized by a source of alternating current. The switches and coils of the circuitry of the clutch-brake unit are connected across additional power lines L-3 and L-4 which are energized by a source of direct current.

As shown in FIG. 14, the packaging machine 21 is turned on by closing an off-on switch 220 to connect the power lines L-1 and L-2 to the alternating current power source and by closing an off-on switch 222 to connect the lines L-3 and L-4 to the direct current power source preparatory to initiation of the feeding cycle. Then the operator manually places a leaflet 26 in position across the opening 194 of the slide 193. This breaks the light beam from a photo light PL1 (also see FIG. 8) to the photo cell PC-1 to energize a photo sensitive relay PR1 to close contacts PRS1-1. Then the articles 25 are placed on the supply conveyor 49, and, with the motor 72 running and the supply conveyor moving continuously, the articles are transported by the conveyor to the release point where the stop 75 blocks movement of the first article onto the carrier 96. At the release point, the article breaks a light beam from a photo light PL3 to a photo cell PC-3 (see FIGS. 1 and 5) thereby energizing a photo sensitive relay PR3 to close contacts PRS3-1. Since both of the contacts PRS2-1 and RS3-1 are closed, the closing of the contacts PRS3-1 energizes a relay R2 to close contacts RS2-2 thereby actuating the solenoids S1 and S2 to retract the stop and advance the gripper 76 simultaneously. This releases the first article for movement by the conveyor down the ramp 61 and onto the carrier 96 while holding the second article in place so that only the first article in line is fed onto the carrier. Once the article moves away from the release point, the light beam from the light PL3 again strikes the photo cell PC-3 to cause de-energization of the photo relay PR3 and thereby open the contacts PRS3-1. To prevent relay R2 from de-energizing as this happens, contacts RS2-1 are closed by the energization of relay R2 to seal the relay across the contacts PRS3-1.

As the article 25 is moved by the supply conveyor 49 down the ramp 61 and into the tray 99, a light beam passing from a light pL2 through an opening 227 (FIG. 10) in the tray and to a photo cell PC-2 (see FIGS. 1 and 8) is broken by the article. This energizes a photo relay PR2 to open the contacts PRS2-1 and close contacts PRS2-2 and contacts PRS2-3. The opening of contacts PRS2-1 de-energizes the relay R2 which, in turn, opens the contacts RS2-1 to break the seal around the contacts PRS3-1. De-energization of relay R2 also opens contacts RS2-2 and this deactuates the solenoids S1 and S2 so that the springs 86 and 92 advance the stop 75 and retract the gripper 76, respectively, so that the supply conveyor 49 advances an article to the release point and against the stop preparatory to the next cycle of the feeder 20.

To initially start the automatic cycling of the feeder 20 so that the carrier 96 will move the article 25 to the loading station 31, the operator must press two reset buttons (see FIG. 14) PB-1 and PB-2 to close their respective contacts to cause the rotary conveyor 24 to advance the carton 23 into the loading station. With the contacts PRS2-2 being closed because of the energization of photo cells PC-2, the closing of the contacts PB-1 energizes a relay R4 to close contacts RS4-1 and contacts RS4-3. The closing of the contacts RS4-1 seals the circuit around reset button PB-1 to keep the relay R4 energized after the operator releases the button. The closing of the contacts RS4-3 completes a portion of the circuit required to actuate the drive unit 32 of the rotary conveyor 24. The other portion of the circuit required to be completed to actuate the drive unit of the rotary conveyor is completed when contacts RS7-3 are closed. The latter contacts are closed when relay R7 is energized by the closing of the contacts for the reset button PB-2. Upon energization of relay R7, contacts RS7-1 also close to seal around the contacts for button PB-2 to keep the relay R7 energized when the button is released. This keeps the contacts RS7-3 normally closed to complete the circuitry for actuation of the drive unit of the rotary conveyor. After initiation of the first feeding cycle by the reset buttons, it will be appreciated that the feeder thereafter continues to cycle automatically unless stopped for some reason.

With the drive unit 32 of the rotary conveyor 24 actuated, the normal step-by-step operation of the rotary conveyor advances the carton 23 into the loading station 31. Upon advancement into the loading station, the presence of the carton is sensed by the mechanical limit switch LS-60. The limit switch is closed upon being depressed by the bottom 39 of the carton and thus, along with checking the presence of the carton, the switch senses whether the bottom of the carton is closed. Should the bottom not be closed, the switch LS-60 will not close thereby indicating that a proper carton is not present.

With a properly sealed carton 23 at the loading station 31, the switch LS-60 is closed to energize a time delay relay RD1 which, in turn, closes contacts RDS1-1 after passage of a suitable time period to make sure that the carton is stopped before the contacts RDS1-1 are closed. Once the contacts RDS1-1 close, a second time delay relay RD2 and a relay R5 are energized the contacts RDS2-1 of the time delay relay remaining closed for a predetermined time after energization of the relay. Energization of relay R5 causes contacts RS5-1 to open and if the contacts PRS2-2 are closed, the relay R4 remains energized. The contacts PRS2-2 remain closed as long as the article 25 is on the carrier 96 and blocks the beam from light PL2 striking photo cell PC-2. Thus, energization of relay R5 interrogates whether or not an article has reached the carrier and is ready to be fed into the dwelling carton.

If no article is on the carrier 96 when the relay R5 is energized, the opening of the contacts RS5-1 de-energizes the relay R4 so that the previously open contacts RS4-2 close to turn on a light AL indicating that no article is on the carrier. Advantageously, de-energization of the relay R4 also opens the contacts RS4-1 to break the seal around the reset button PB-1 and opens the contacts RS4-3 to stop the drive unit 32 of the rotary conveyor 24 to prevent the carton 23 at the loading station from being advanced without receiving an article and a leaflet. In addition, the contacts RS4-4 previously closed when relay R4 was energized are opened to de-energize the time delay relay RD1 which, in turn, de-energizes time delay relay RD2 and the relay R5. To start the feeding cycle again, the operator may place an article on the carrier and press the reset button PB-1 to close its contacts.

After the carton 23 and the article 25 are in their proper places and during the time period that the presence of the article on the carrier 96 is being interrogated, energization of the relay R5 closes the contacts RS5-2 and, with the carton present on the carrier to keep the contacts PRS2-3 closed, and relay R3 is energized to start the feeding cycle. When relay R3 is energized, contacts RS3-2 and contacts RS3-4 are closed and contacts RS3-1 and contacts RS3-3 are opened. As the contacts PS3-3 open and the contacts RS3-4 close, the clutch-brake unit 134 is conditioned to release the brake and engage the clutch of the unit to turn the cycle shaft 91 so that the carrier is pivoted away from the pick off station 53 to deliver the article to the loading station 31. The opening of the contacts RS3-1 prevents the relay R2 from being energized as the carrier 96 moves toward the loading station and the contacts PRS2-1 close. The closing of the contacts RS3-2 seals in the relay R3 to avoid de-energization of the relay R3 when contacts PRS2-3 open as the carrier moves away from the pick off station. If the relay R3 were not sealed in by the contacts RS3-2, the relay R3 would be de-energized as the contacts PRS2-3 open and would cause the contacts RS3-3 and contacts RS3-4 to close and open, respectively, to disengage the clutch and apply the brake of the clutch-brake unit 134 and thereby stop the carrier from moving to the loading station.

To keep the relay R4 energized after the contacts PRS2-2 are opened during the feeding cycle, the previously energized time delay relay RD2 triggers and opens contacts RDS2-1 to de-energize relay R5 after a suitable period of time from the energization of relay R5. This is done just before the carrier 96 starts to move out of the pick off station 53 and before the contacts PRS2-2 are opened. Thus, with the present arrangement, the relay R5 is energized only for a moment to interrogate the presence of the article 25 on the carrier and to close the contacts RS5-2 to start the feeding cycle.

Once the feeding cycle has been started, the clutch remains engaged so that the carrier 96 is pivoted to the loading station 31 to position the article 25 in the upright position for insertion into the carton 23 dwelling at the loading station. While the article is held in the upright insertion position, the plunger 97 advances to drive the article from the carrier, against the leaflet 26 and then into the dwelling carton. To make sure that the article is inserted completely into the carton before the rotary conveyor 24 is indexed, a mechanical limit switch LS-61 is closed by the plunger arm 177 as it reaches the lower end of its stroke (see FIG. 12). Just thereafter, a cam 221 on the cycle shaft 91 (FIGS. 11 and 12) momentarily opens a mechanical limit switch LS-62. Thus, if the plunger arm has reached the lower limits of its stroke to insert the article completely into the carton and close the switch LS-61, the relay R7 remains energized to maintain the circuit to the conveyor drive unit 32.

If the article 25 jams and is not inserted completely into the carton 23, the plunger arm 177 does not reach the lower limits of its stroke and does not close the switch LS-61. Then, when the switch LS-62 is opened, the relay R7 will be de-energized to close the contacts RS7-2 previously opened when relay R7 was energized. This turns on a light FL to indicate an improper feeding of the article into the carton and the same time, opens contacts RS7-3 to stop the drive unit 32 from advancing the rotary conveyor 24 and possibly causing damage to the article or the packaging machine 21.

It will be appreciated that since the clutch-brake unit 134 actuating the feeder 20 is not affected by the shut down of the drive unit 32, the feeder will complete its cycle and return the carrier 96 to the pick off station 53. This causes the switch LS-62 to close again since the cycle shaft 91 turns during return of the carrier, but the relay R7 will not be energized because the contacts RS7-1 remain open after the relay R7 is de-energized. Thus, once the jam has been corrected, the reset button PB2 must be pressed to energize the relay R7 to actuate the drive unit to advance the carton 23 out of the loading station 31.

In the normal operation of the feeder 20 as the plunger 97 drives the article 25 into the carton 23, the suction pick off device 200 is pivoted toward the bottom of the stack 196 of leaflets 26, the vacuum is turned on and, as the plunger moves through its upstroke, one of the leaflets is pulled down onto the slide 193. Then the vacuum is shut off and releases the leaflet for slipping down the slide into position across the opening 194. Operation of the vacuum is controlled by a solenoid S3 (FIG. 14) which moves a valve 217 between open and closed positions to connect a vacuum source to the flexible hoses 198 (FIG. 4) which leads to the cups 203 through the tubes 201. Herein, the solenoid S3 is actuated when a mechanical limit switch LS-64 is closed by a small cam 218 (FIGS. 1 and 11) mounted on the cycle shaft 91. Preferably, the cam 218 closes the switch LS-64 when the pick off device reaches the bottom of the stack and opens the switch LS-64 when the cups are level with the surface of the slide. Thus, the leaflet is released to slide down the slide and into a position interrupting the light beam from the light PL1 to the photo cell PC-1. This, in turn, energizes the photo sensitive relay PR1 to close the contacts PRS1-1.

If the contacts PRS1-1 are not closed, the escapement mechanism 134 cannot be actuated to advance an article 25 onto the carrier 96 since the relay R2 cannot be actuated. Thus, it is assured that a feeding cycle will not begin unless one of the leaflets 26 is in place to be inserted into the carton 23 because, without an article on the carrier, relay R4 will be de-energized when the carton presence is interrogated since the contacts PRS2-2 will be open. This, in turn, will cause the switch RS4-3 to open and the switch RS4-2 to close thereby shutting down the drive unit 32 to the rotary conveyor 24 and turning on the no article light AL.

After the article 25 has been fed into the carton 23, the carrier 96 begins its return to the pick off station 53 but, before the carrier returns completely, the relay R3 is de-energized by opening of a limit switch LS-66 by a cam 223 which is on the cycle shaft 91 as shown in FIGS. 11 and 12. The carrier, however, continues to be moved toward the pick off station because the clutch of the clutch-brake unit 134 remains engaged even though de-energization of relay R3 closes the contacts RS3-3 and opens the contacts RS3-4. This is because a mechanical limit switch LS-65 is moved from contact 224 to contact 225 by a cam 226 mounted on the cycle shaft 91 (see FIGS. 1 and 8) and closes the circuit to the clutch to keep the clutch engaged until the carrier is pivoted back to the pick off station. When the carrier returns to the pick off station, the cam 226 moves the switch LS-65 from the contact 225 in the clutch circuit and closes on the contact 224 with the brake circuit to stop the carrier at the loading station. With the de-energization of the relay R3, the contacts RS3-1 also are closed and, as soon as the carrier is moved into the pick off station far enough to avoid breaking the light beam to the photo cell PC2, the relay R2 will be energized thereby causing actuation of the solenoids S1 and S2 to move the stop 75 and gripper 76 to release an article to move onto the carrier preparatory to the next cycle.

Upon completion of a feeding cycle, the drive unit 32 is actuated to index the rotary conveyor 24 and advance the next carton 25 into the loading station 31. As the loaded carton leaves the loading station, the limit switch LS-60 is opened thereby de-energizing the time delay relays RD1 and RD2 preparatory to next feeding cycle.

from the foregoing, it will be apparent that the novel feeder 20 of the present invention will not run through a feeding cycle unless the leaflet 26, the article 25 and the carton 23 are in their designated positions preparatory to the initiation of the cycle to assure that each carton will receive an article and leaflet. Moreover, the feeder cycles automatically as long as the leaflets, the articles and the cartons are available. Should either the leaflet, the article or the carton be unavailable for a feeding cycle during the operation of the packaging machine 21, no feeding cycle will be started. If the leaflet and the article are available and the carton is not, the rotary conveyor 24 will continue to index until a carton reaches the loading station 31 and then the feeder will cycle. When the carton is available to receive the leaflet and the article and either the leaflet or article is not, the rotary conveyor will be stopped from further indexing until the missing item is placed in position and the reset button PB-1 is pressed to actuate the drive unit 32 of the rotary conveyor. Similarly, if an article should jam while being inserted into the carton, the indexing of the rotary conveyor is stopped until the problem is corrected and reset button PB-2 is pressed to actuate the drive unit. In this regard, the reset buttons PB-1 and PB-2 serve as safety features to prevent injury to the operator of the feeder by keeping the feeder from cycling automatically at the same instant the feeder has been prepared to cycle so that the operator has time to get out of the way of the moving parts of the feeder after a shut down has been corrected.

I claim:

1. An article feeder for a packaging machine in which open cartons are advanced step-by-step to a loading station where an article is inserted into each carton during the dwell period of said packaging machine, said feeder including a support, a supply conveyor for transporting said articles one-by-one to a pick off station located at one end of the conveyor and spaced from said loading station, a carrier mounted on said support for movement between said pick off station and said loading station and operable, when at the pick off station, to receive one of said articles and thereafter to bodily transport said article to the loading station while turning the article into position for insertion into the carton dwelling at the loading station, and a reciprocable plunger mounted on said support at said loading station and operable in timed relation with the movement of said carrier to drive said article from the carrier and into the carton.

2. The article feeder as defined by claim 1 further including means for continually moving said supply conveyor, an escapement mechanism near the discharge end of said conveyor and operable to block movement of said articles by said conveyor to accumulate a line of successive articles behind a release point positioned upstream of said pick off station, and means for periodically actuating said escapement mechanism to release the leading article for movement by said conveyor from said release point and into said pick off station.

3. An article feeder as defined by claim 2 wherein said escapement mechanism includes a stop mounted adjacent one side of the conveyor at the release point to move between a catch position blocking the path of the advancing articles and a release position out of the way of the advancing articles, means for moving said stop into said release position while the carrier rests at said pick up station to receive one of said articles, for thereafter moving said stop into said catch position, and for holding the stop in such position during delivery of the article by said carrier, a gripper mounted adjacent said conveyor upstream of said stop and movable between closed and open positions to hold and release the succeeding article thereby to prevent and permit advance of said articles by said conveyor, and means for moving said gripper between its positions in timed relationship with the movement of said stop so that, when said stop is in its catch position, said gripper is in its open position and, when the stop is in its release position, said gripper is in its closed position thereby to advance only the leading article into the carrier each time the latter rests in said pick off station.

4. An article feeder as defined by claim 3 wherein said conveyor includes a side guard mounted along the side of the conveyor opposite said gripper, said gripper including an arm with a free end movable toward and away from said guard as said arm is moved to close and open the gripper, and a holding pad attached to the free end of said arm for engagement with the succeeding article to clamp the latter against the guard and stop movement of the upstream articles past said gripper.

5. An article feeder as defined by claim 1 further including clamp means on said carrier for holding said article on the carrier during movement between said stations.

6. An article feeder as defined by claim 5 wherein said carrier includes a pivot arm mounted on said support to swing in an arcuate path between said stations, and a tray mounted on the free end of said arm to receive said article from the supply conveyor.

7. An article feeder as defined by claim 6 wherein said clamp means includes a fixed jaw located at one side of said tray, a movable jaw mounted on the opposite side of said tray, and means for moving said movable jaw away from and toward said fixed jaw to open said jaws to receive an article on said tray and to clamp said article for movement with said tray.

8. An article feeder as defined by claim 7 further including a spring normally urging said movable jaw toward said fixed jaw, a cam surface located on said support adjacent said pick off station and in close proximity with the arcuate path of movement of said tray, and a cam follower mounted on said movable jaw and engageable with said cam surface when said tray is at the pick up station thereby to overcome said spring and move said movable jaw away from said fixed jaw.

9. An article feeder for a packaging machine in which open cartons are advanced step-by-step to a loading station where an article and a leaflet are inserted into each carton during the dwell period of said packaging machine, said feeder including a suport, means mounted on said support for delivering said article from a supply of articles and into an insertion position in alignment with the open end of the carton dwelling at the loading station, a magzine for holding a stack of said leaflets and mounted on said support adjacent said loading station, means for removing said leaflets one at a time from the magazine and feeding the removed leaflet into a rest position with an intermediate portion of the leaflet disposed across the open end of the carton between the latter and the article, and a reciprocable plunger mounted on said support in line with said carton, said leaflet and said article and operable to move through an advance stroke to drive said article from said insertion position and into the carton with the article engaging the intermediate portion of the leaflet, folding the end portions of the leaflet along opposing sides of the article and stuffing the leaflet into the carton as an incident to being inserted into the carton, said last-mentioned means including a slide extending beneath said magazine and into said loading station and having an opening therein positioned across the open end of said carton, and a suction pick off device mounted on said support for movement between the end leaflet in said stack and said slide and operable to pick off said end leaflet and transfer the leaflet to said slide to be fed by gravity down the slide to position the intermediate portion of said leaflet across said opening for engagement by said article as the latter is stuffed through the opening and into the carton.

10. An article feeder for a packaging machine in which open cartons are advanced step-by-step along a predetermined path to a loading station where an article and a leaflet are inserted into each carton during the dwell period of said packaging machine, said feeder including a support, a supply conveyor mounted on said support for transporting a plurality of articles in substantially horizontal positions to a pick off station located at one end of the conveyor and spaced from said loading station, means for continually moving said supply conveyor, an escapement mechanism operable to block movement of said articles by said conveyor to accumulate a line of successive articles behind a release point located upstream of said pick off station and to release said articles one at a time for movement to said pick off station, a carrier mounted on said support for movement between said pick off station and said loading station and operable to receive one of said articles when at the pick off station and thereafter to bodily transport said article to the loading station while turning the article into an upright position for insertion into the carton dwelling at the loading station, a magazine for holding a stack of said leaflets and mounted on said support adjacent said loading station, a slide extending beneath said magazine and into said loading station and having an opening therein positioned across the open end of said carton, a pick off device mounted on said support for movement between the end leaflet in said stack and said slide and operable to remove the end leaflet from the stack and transfer such leaflet to said slide to be fed by gravity down the slide and across said opening with opposite end portions of the leaflet supported by the slide on opposite sides of the opening to locate an intermediate portion of the leaflet across the opening in line with and between the upright article and the open end of the carton, and a reciprocable plunger mounted on said support adjacent said loading station and operable to move through an advance stroke to drive said upright article from the carrier and into the carton with the article engaging the intermediate portion of the leaflet, folding the end portions of the leaflet along opposing sides of the article and stuffing the leaflet into the carton as an incident to being inserted into the carton.

11. In a packaging machine for inserting articles and leaflets into cartons, the combination of, a conveyor operable to transport said cartons step-by-step along a predetermined path to a loading station where the articles and leaflets are inserted into the cartons during the dwell period of said conveyor, means operable through a feeding cycle to feed an article into the carton dwelling at the loading station and to position a leaflet for insertion into such carton, a first detector operable to produce a signal in response to sensing that the leaflet is in position for insertion into the carton dwelling at the loading station, a second detector operable to produce a second signal in response to sensing that the article is available to be fed into the carton, a third detector operable to produce a third signal in response to sensing that a carton is positioned at said loading station to receive said article and said leaflet, and means acutatable only upon receipt of all of said signals to initiate the feeding cycle of said feeding means.

12. In a packaging machine for inserting articles and leaflets into cartons, the combination of, a first conveyor operable to transport said cartons step-by-step along a predetermined path to a loading station where the articles and the leaflets are inserted into the cartons during the dwell periods of said conveyor, means for delivering leaflets one at a time into position for insertion into a carton dwelling at the loading station, a first detector operable to produce a signal in response to sensing that the leaflet is in position for insertion into the carton, a second conveyor positioned adjacent said first conveyor and operable to carry said articles toward a pick off station spaced from said loading station, means located adjacent one end of said second conveyor and operable in response to the signal from said first detector to release said articles one at a time for movement by said second conveyor into said pick off station, a second detector operable to produce a second signal in response to sensing that the article is in the pick off station, a third detector operable to produce a third signal in response to sensing that a carton is available in said loading station to receive one of said articles and one of said leaflets, a carrier for receiving said article at the pick off station and operable only upon receipt of the second and third signals to move said article from said pick off station to said loading station and into a position for insertion into said carton, and a plunger for driving said article from said insertion position and into the carton with said leaflet being stuffed into the carton as an incident thereto, said means for delivering the leaflets being operable after said article has been driven into the carton to position another leaflet for sensing by said first detector preparatory to the next feeding cycle.

13. A packaging machine as defined by claim 12 including a drive means to power said first conveyor, and means for rendering said drive means inoperable to move said first conveyor to transport a carton from said loading station without an article and a leaflet when said second detector signals at the beginning of a feeding cycle that an article is not at said pick off station.

14. A packaging machine as defined by claim 13 including means for producing a signal when said plunger fails to drive said article completely into said carton, the latter signal rendering said drive means inoperable to move said first conveyor thereby to prevent such conveyor from being advanced from said loading station with the article protruding from the carton.

15. In a packaging machine for inserting articles and leaflets into cartons with open upper ends and closed lower ends, the combination of, an intermittent conveyor for transporting the cartons step-by-step along a predetermined path to a loading station where the articles and the leaflets are inserted into the cartons during the dwell periods of the conveyor, a continuously moving conveyor positioned adjacent the path of said advancing cartons and operable to transport said articles to a pick off station spaced from said loading station, an escapement mechanism operable to block movement of said articles by said continuous conveyor to accumulate a line of successive articles behind a release point positioned upstream of said pick off station, said escapement mechanism being periodically operable to release successive ones of said articles one at a time from said release point for movement by said continuous conveyor into said pick off station, means for carrying the released article from the pick off station to the loading station and for inserting the article into a carton at the loading station during the dwell period of said intermittent conveyor, means supplying a leaflet to each carton and for positioning such leaflet for stuffing into the carton as an incident to the insertion of an article into a carton, and means controlling said carrying means to prevent operation of the latter until it is assured that a leaflet is in position to be stuffed into the carton, that an article is in the pick off position and that a carton with a closed lower end is present in the loading station, said controlling means including a first detector operable to produce a signal in response to sensing that the leaflet is in position for insertion into the carton, a second detector operable to produce a second signal in response to sensing that the article is in said pick off station to be delivered to the loading station, said escapement mechanism being actuated to release the article from said release point to move into said pick off station in response to receiving the signal from said first detector and in the absence of a signal from said second detector, and a third detector operable to produce a third signal upon sensing that the carton is present in the loading station and that the lower end of the carton is closed, said carrying means being actuated in response to receiving the second and third signals from said second and third detectors to deliver the article from the pick off station to the loading station and to insert the article and the leaflet into the dwelling carton.

16. A packaging machine as defined by claim 15 including a fourth detector operable in response to detecting the presence of an article at the release point to produce a signal further controlling actuation of said escapement mechanism whereby said escapement mechanism is actuated in response to receipt of the signals from both said first detector and said fourth detector and in absence of a signal from said second detector.

17. An article feeder for a packaging machine in which cartons are advanced step-by-step to a loading station where an article and a leaflet are inserted into each carton during the dwell period between steps, said feeder including means for positioning a leaflet at the loading station for insertion into a carton, a supply conveyor for transporting the articles toward a pick off station spaced from the loading station, drive means for continuously moving said supply conveyor, an escapement mechanism near the discharge end of said conveyor and operable to release said articles one at a time for movement by said conveyor into the pick off station, a carrier for moving the release article from said pick off station and into position for insertion into the carton at the loading station, a plunger mounted adjacent the loading station and movable through an advance stroke to drive the article from the carrier and into the carton with the article engaging the leaflet and stuffing the leaflet into the carton as an incident to being inserted into the carton, a first photoelectric cell adjacent the loading station and operable to produce a signal in response to detection of the presence of the leaflet when in position for insertion into the carton, said signal being operable to cause said escapement mechanism to release the one article to move into the carrier at the pick off station, a second photoelectric cell adjacent said pick off station and operable to produce a signal in response to detection of the article when on the carrier at the pick off station, and detector means operable to produce a signal in response to the presence of the carton at the loading station, the signals from the second photoelectric cell and the detector means causing the carrier and the plunger to effect insertion of the article and the leaflet into the carton and causing said first mentioned means to position another leaflet at the loading station preparatory to the next feeding cycle.

* * * * *